United States Patent [19]

Altman et al.

[11] Patent Number: 4,533,512
[45] Date of Patent: Aug. 6, 1985

[54] METHOD AND APPARATUS FOR BENDING MULTIPLE CHANNEL TUBING

[75] Inventors: Murray Altman, Fort Lee; Gerald J. Bellasalma, West Caldwell, both of N.J.

[73] Assignee: Thermasol, Ltd., Leonia, N.J.

[21] Appl. No.: 194,356

[22] Filed: Oct. 6, 1980

Related U.S. Application Data

[62] Division of Ser. No. 5,377, Jan. 22, 1979, Pat. No. 4,240,166.

[51] Int. Cl.³ .............................................. B29C 17/02
[52] U.S. Cl. ................................... 264/339; 264/154; 425/392
[58] Field of Search ............... 264/154, 285, 295, 339; 425/392, 468

[56] References Cited

U.S. PATENT DOCUMENTS

| | | | |
|---|---|---|---|
| 3,051,774 | 8/1962 | Schelke | 425/468 |
| 3,957,032 | 5/1976 | Jelesko | 425/392 |
| 4,041,553 | 8/1977 | Sussman . | |
| 4,135,255 | 1/1979 | Menendez . | |

FOREIGN PATENT DOCUMENTS

| | | | |
|---|---|---|---|
| 801670 | 12/1968 | Canada . | |
| 853099 | 10/1970 | Canada . | |
| 1007023 | 3/1977 | Canada . | |
| 53-59763 | 5/1978 | Japan | 264/295 |

*Primary Examiner*—James Lowe
*Attorney, Agent, or Firm*—Lerner, David, Littenberg, Krumholz & Mentlik

[57] ABSTRACT

Thermoplastic multiple channel tubing, which includes at least a pair of channels separated by a partition, is bent into a desired shape or configuration by softening the tubing and then bending it into the desired shape or configuration. The tubing is pegged and clamped so as to maintain the shape of the clamped portion of the tubing, as well as the shape of the partition and its proper orientation with respect to the rest of the tubing, during the bending operation.

19 Claims, 11 Drawing Figures

METHOD AND APPARATUS FOR BENDING MULTIPLE CHANNEL TUBING

This is a division of application Ser. No. 005,377, filed Jan. 22, 1979, now U.S. Pat. No. 4,240,166, issued Dec. 25, 1980.

FIELD OF THE INVENTION

The present invention relates to a method and apparatus for bending thermoplastic, multiple channel tubing which is especially useful in whirlpool systems and, more particularly, to such tubing which includes at least a pair of channels separated by a partition.

BACKGROUND OF THE INVENTION

Recently, travelers, businessmen, skiers, golfers, tennis players and other sportsmen have become increasingly aware of the benefits of a whirlpool bath in which water is agitated to create an invigorating whirlpool motion. The swirling waters of a whirlpool bath are believed by many to calm frayed nerves, ease the pain of aching muscles, and sooth sore feet.

In recognition of the increasing popularity of whirlpool baths, many motels, hotels, and inns are installing in-room whirlpool baths in an effort to gain a competitive edge. However, in order to be profitable, and therefore result in a true competitive edge, such whirlpool baths must be simple to install, operate, and service.

Some known whirlpool baths, such as the one disclosed in Jacuzzi U.S. Pat. No. 3,571,820, include a number of jet assemblies spaced around the outer periphery of a bathtub for agitating water in the bathtub. In these known whirlpool baths, a water and air supply piping systems, including several pieces of pipe joined together by elbows and T-fittings, are used to supply each of the jet assemblies with water and air, respectively. The installation of the elbows and T-fittings increases construction time and costs, in terms of both materials and labor. The elbows and T-fittings also complicate repairs and replacement.

Everston U.S. Pat. No. 3,263,678 discloses a therapeutic bathtub having a plurality of aspirating fittings designed specifically to diffuse finely divided air bubbles throughout the water in the bathtub. Thus, the aspirating fittings perform a function, i.e., the diffusion of finely divided bubbles, which is different than and may be performed in addition to the conventional function of providing agitated water to produce a whirlpool bath. Nevertheless, the aspirator fittings are supplied water and air from a piping network in which several individual pieces of pipe are interconnected by elbows and T-fittings.

Efforts have been made to avoid the problems and disadvantages resulting from the use of elbows and T-fittings in whirlpool systems. For instance, in Mathis U.S. Pat. No. 3,890,656, there is disclosed a whirlpool jet for bathtubs which purportedly eliminates the use of T-fittings by making all ater and air pipe connections directly to a corresponding water jet outlet. However, because the water jet outlets described and claimed in the Mathis patent are actually T-fittings, which have been designed to perform a jetting function, the water jet outlets of each pair of adjacent outlets are connected by separate pieces of water and air supply pipes. The provision of several pieces of pipe not only complicates installation, thereby increasing initial construction time and costs, but also complicates repairs and replacements resulting in increased maintenance costs. Furthermore, inasmuch as the individual outlets are permanently cemented to the water and air supply pipes, the outlets are totally incapable of quick and easy on-site removal independently of the water and air supply pipes for inspection, cleaning and replacement purposes.

SUMMARY OF THE INVENTION

Many of the disadvantages and shortcomings of the whirlpool baths and other devices discussed above are overcome by the present invention which a new and improved method and apparatus useful in bending thermoplastic, multiple channel tubing, which includes at least a pair of channels separated by a partition. More particularly, the method involves providing the tubing with a plurality of holes at predetermined locations along the length thereof. The tubing is then softened to an extent such that it is bendable. Pegs are inserted through each of the holes in the softened tubing, which is also clamped in the vicinity of each of the holes therein. Before, during or after the pegging and clamping of the softened tubing, it is bent into a desired shape or configuration, such as one which substantially matches the outer contour of a bathtub or some other water receptacle.

In accordance with the apparatus, maintaining means is provided for maintaining the cross-sectional shape of a section of the softened tubing and for maintaining the shape of the partition and its proper orientation with respect to the rest of the tubing. The maintaining means includes a first member positioned on one side of the tubing and a second member positioned on an opposite side of the tubing. The first and second members have surfaces with a contour which substantially matches at least a portion of the cross-sectional shape of the tubing. A projecting member extends from the first member to the second member through a hole provided in the tubing, including its partition. The projecting member cooperates with the first and second members to maintain the shape of the partition and its proper orientation with respect to the rest of the tubing.

BRIEF DESCRIPTION OF THE DRAWINGS

For a more complete understanding of the invention, reference may be had to the following description of the exemplary embodiments taken in conjunction with the accompanying figures of the drawings, in which.

DESCRIPTION OF THE EXEMPLARY EMBODIMENTS

I. The Overall System

Figure 1:
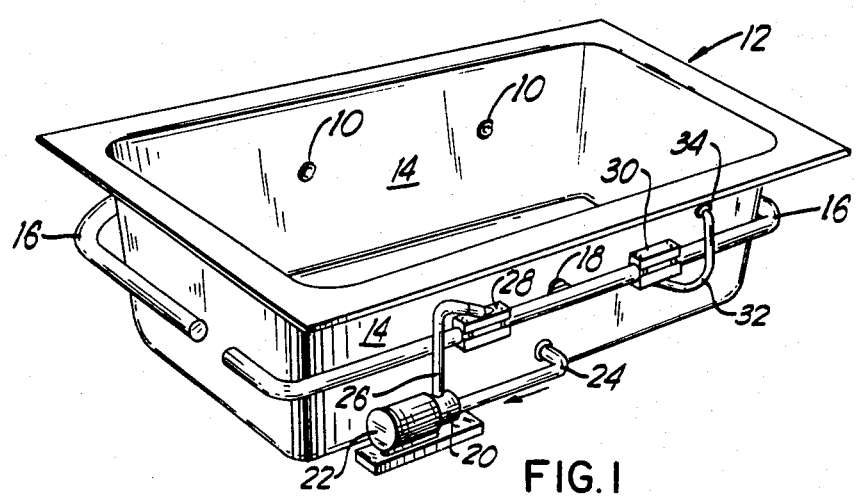
FIG. 1 is a perspective view of one embodiment of a whirlpool system constructed in accordance with the present invention.

The whirlpool system shown in FIG. 1 includes a number of outlets 10 which are spaced apart around the periphery of a bathtub 12. Each of the outlets 10 extends through a sidewall 14 of the bathtub 12 below a predetermined water level line and is connected to a continuous loop of dual channel tubing 16 by a connector assembly 18. The loop of dual channel tubing 16 has a shape which generally matches the outer contour of the bathtub 12.

A pump 20, driven by a motor 22, receives water from the bathtub 12 through a return line 24, which communicates with the interior of the bathtub 12 below its predetermined water level line. Water under pressure is supplied from the pump 20 to one channel of the dual channel tubing 16 through a flexible hose 26 and a saddle clamp type connector 28. Another saddle clamp type connector 30 is connected by a flexible hose 32 to an air port 34 located above the predetermined water level line of the bathtub 12, so that the port 34 will always be open to the atmosphere for supplying air to the other channel of the dual channel tubing 16 at atmospheric pressure.

Figure 4:
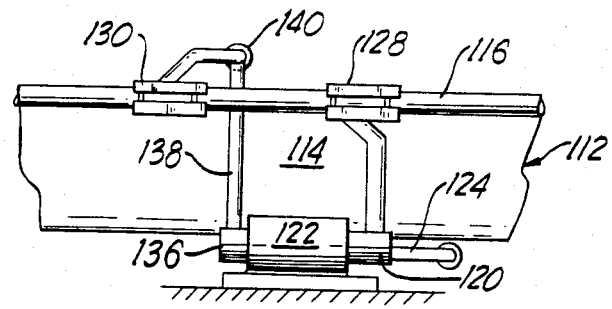
FIG. 4 is a partial elevational view of a second exemplary embodiment of a whirlpool system constructed in accordance with the present invention.
Figure 10:
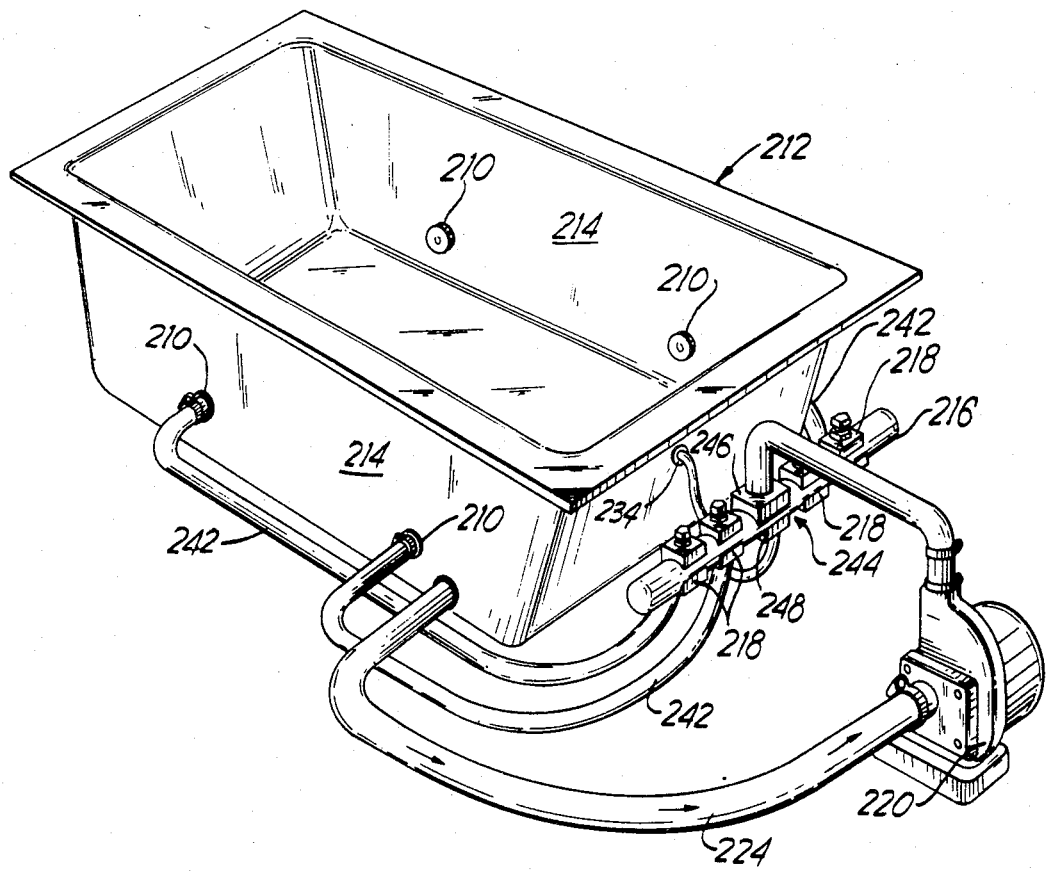
FIG. 10 is a perspective view of a third exemplary embodiment of a whirlpool system constructed in accordance with the present invention.

Other exemplary embodiments of the whirlpool system of FIG. 1 are illustrated in FIGS. 4 and 10. The various elements illustrated in FIGS. 4 and 10 which correspond to elements described above with respect to FIG. 1 have been designated by corresponding reference numerals increased by 100 and 200, respectively. The embodiments of FIGS. 4 and 10 operate in the same manner as the embodiment of FIG. 1, unless it is otherwise stated.

Referring now to FIG. 4, a pump 120 and a compressor 136 are driven by a double-ended motor 122, so that air at greater than atmospheric pressure can be supplied to one channel of dual channel tubing 116 through a supply line 138 and a saddle clamp type connector 130. Alternatively, the pump 120 and the compressor 136 can be driven by a pair of separate motors.

The pressure of the air can be regulated from inside a bathtub 112 by a conventional air pressure regulator 140 communicating with the supply line 138. Supplying air under pressure via the compressor 136, the supply line 138, and the regulator 140 eliminates the need for the flexible hose 32 and the port 34 of the embodiment of FIG. 1.

The whirlpool system shown in FIG. 10 includes dual channel tubing 216 and a number of connector assemblies 218 removably mounted to the dual channel tubing 216, which therefore acts as a header. Because the dual channel tubing 216 is located at one end of a bathtub 212, the connector assemblies 218 are relatively remote from at least some outlets 210, each of which is connected to a corresponding one of the connector assemblies 218 by a flexible hose 242 or any other suitable conduit. The location of the dual channel tubing 216 can be changed depending upon the configuration of the overall whirlpool system.

A saddle clamp type connector 244 replaces the saddle clamp type connectors 28 and 30 of the embodiment shown in FIG. 1. More particularly, the saddle clamp type connector 244 has an upper clamp member 246, which connects a pump 220 to one channel of the dual channel tubing 216, and a lower clamp member 248, which connects an air port 234 to the other channel of the dual channel tubing 216.

II. The Nozzle Type Connector Assembly Embodiments

Figure 3:
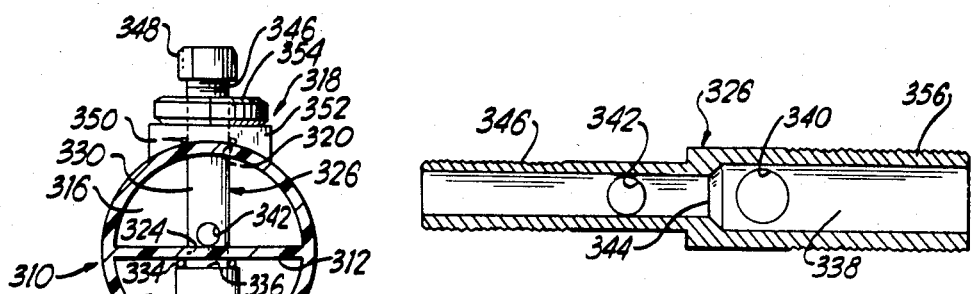
FIG. 3 is a cross-sectional view of a nozzle utilized in the connector assembly illustrated in FIG. 2.
Figure 2:
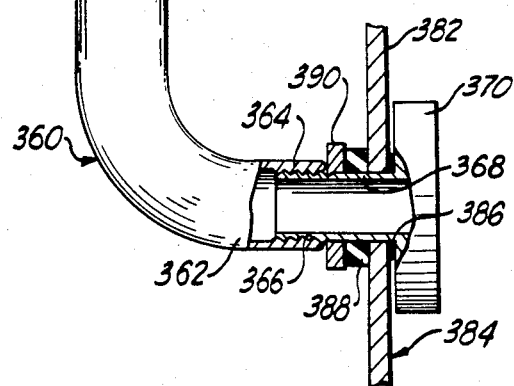
FIG. 2 is a partial cross-sectional view of a first exemplary embodiment of a connector assembly constructed in accordance with the present invention.

As shown in FIGS. 2 and 3, dual channel tubing 310 has a cylindrical shape, although any other suitable shape may be used, with a partition 312 extending across the interior of the tubing 310 to form an air channel 314 and a water channel 316. Although the partition 312 is shown extending across a diameter of the dual channel tubing 310, the partition 312 may extend across any chord of the tubing 310.

At each location where a connector assembly 318 is to be inserted through the dual channel tubing 310, a pair of holes 320, 322 is provided, the hole 320 being formed in the top of the tubing 310 diametrically opposite the hole 322, which is formed in the bottom of the tubing 310. Another hole 324, having a diameter substantially equal to the diameter of the hole 320 but somewhat less than the diameter of the hole 322, is formed in the partition 312 and aligned with the holes 320, 322, so that a nozzle 326 can be inserted therethrough.

The nozzle 326, which forms a part of a corresponding connector assembly 318, includes a small diameter portion 330, which extends through the holes 320, 324 and the water channel 316, and a large diameter portion 332, which extends through the hole 322 and into the air channel 314. An O-ring 334 interposed between the partition 312 and a shoulder 336 formed at the juncture of the small diameter portion 330 and the large diameter portion 332 forms a fluid-tight seal between the air channel 314 and the water channel 316.

A fluid passageway 338 (see FIG. 3) runs the length of the nozzle 326 and communicates with the air channel 314 and the water channel 316 through an air inlet opening 340 and a water inlet opening 342, respectively. To facilitate drainage of water from the dual channel tubing 310, the bottom of the air inlet opening 340 and the water inlet opening 342 are at an elevation no higher than the elevation of the bottoms of the air channel 314 and the water channel 316, respectively. The portion of the passageway 338 between the air inlet opening 340 and the water inlet opening 342 includes a venturi 344 (see FIG. 3) designed to enhance the mixing of water and air in the passageway 338 and to speed the flow of water and air through the passageway 338.

The free end of the small diameter portion 330 extends upwardly through the hole 320 formed in the top of the dual channel tubing 310 and is provided with an externally threaded portion 346 designed to threadedly engage an internally threaded cap 348. By removing the cap 348, access may be had to the passageway 338 for the purposes of inspection and cleaning.

An O-ring 350, disposed about the free end of the small diameter portion 330, seals the hole 320 formed in the top of the dual channel tubing 310. The O-ring 350 is held in sealing engagement against the top of the tubing 310 by a jaw member 352, slidably received on the free end of the small diameter portion 330 of the nozzle 326, and a lock nut 354, having an internally threaded portion (not shown) which threadedly engages the externally threaded portion 346 of the free end of the small diameter portion 330, for forcing the jaw member 352 into positive engagement with the O-ring 350.

The free end of the large diameter portion 332 of the nozzle 326 extends downwardly through the hole 322 in the bottom of the dual channel tubing 310. An externally threaded portion 356 provided on the free end of the large diameter portion 332 threadedly engages an internally threaded portion (not shown) formed in the vertical end 358 of a relatively rigid elbow 360. The horizontal end 362 of the elbow 360 has an internally threaded portion 364 which threadedly engages an externally threaded portion 366 formed on a stem portion 368 of an outlet 370. Although the elbow 360 is shown as having a 90° bend, the bend can be more or less than 90° depending upon the designs and relative positions of the nozzle 326 and the outlet 370. Moreover, the elbow 360 could be replaced by a flexible hose or any other suitable connecting device.

An O-ring 372, disposed about the free end of the large diameter portion 332, seals the hole 322 formed in the bottom of the dual channel tubing 310. The O-ring 372 is held in sealing engagement against the bottom of the tubing 310 by a jaw member 374, which is slidably received on the free end of the large diameter portion 332 and forced into positive engagement with the O-ring 372 by a lock nut 376 threadedly engaged on the free end of the large diameter portion 332.

A fluid-tight seal is also formed between the outlet 370 and a sidewall 382 of a bathtub 384 by an O-ring 386, a gasket 388, and a lock nut 390. The O-ring 386 is disposed about the stem portion 368 of the outlet 370 between the outlet 370 and the sidewall 382. The gasket 388 and the lock nut 390 are also disposed about the stem portion 368, but on the opposite side of the sidewall 382 from the O-ring 386. The lock nut 390 threadedly engages the externally threaded portion 366 of the stem portion 368 so as to force the O-ring 386 and the gasket 388, both of which can be made of rubber or any other suitable material, into sealing engagement with the sidewall 382 of the bathtub 384.

Figure 6:
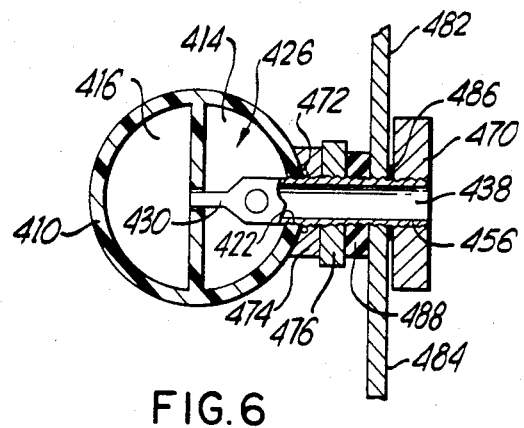
FIG. 6 is a cross-sectional view of a third exemplary embodiment of a connector assembly constructed in accordance with the present invention.
Figure 9:
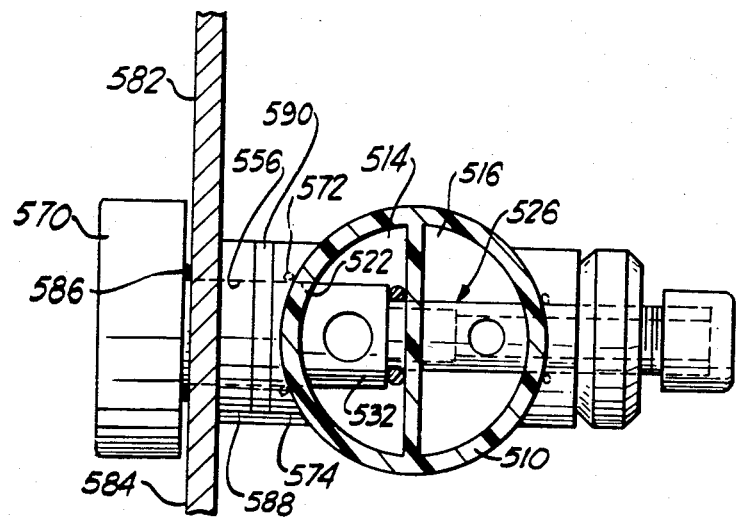
FIG. 9 is a cross-sectional view of a sixth exemplary embodiment of a connector assembly constructed in accordance with the present invention.

Referring now to FIGS. 6 and 9, there are shown two futher embodiments of the exemplary connector assembly embodiment of FIGS. 2 and 3. The various elements illustrated in FIGS. 6 and 9 which correspond to elements described above with respect to FIGS. 2 and 3 have been designated by corresponding reference numerals increased by 100 and 200, respectively. Unless otherwise stated, the further embodiments operate in the same manner as the embodiment of FIGS. 2 and 3.

In the embodiment of FIG. 6, a horizontally extending nozzle 426 has a small diameter portion 430 which communicates with a water channel 416 but does not extend therethrough. The interior end of a passageway 438 extending through the nozzle 426 functions as a water inlet, thereby replacing the water inlet opening 342 of the embodiment of FIGS. 2 and 3. An outlet 470 is adapted to threadedly engage a threaded portion 456 on the nozzle 426. An O-ring 472, jaw member 474, gasket 488, and lock nut 476 are positioned between a sidewall 482 of a bathtub 484 and the outer circumferential surface of a continuous loop of dual channel tubing 410 to form a water-tight seal for an opening 422 in the side of the tubing 410. The lock nut 476 forces the O-ring 472 into sealing engagement with the dual channel tubing 410. Another O-ring 486 and the gasket 488 are forced into sealing engagement with the sidewall 482 of the bathtub 484 by the outlet 470. Although the direct connection of the nozzle 426 with the outlet 470 eliminates the elbow 360 of the embodiment of FIGS. 2 and 3, it necessitates arranging the water channel 416 alongside an air channel 414, rather than above it.

The embodiment of FIG. 9 also includes a continuous piece of dual channel tubing 510 having a water channel 516, which is arranged alongside an air channel 514. Because the elbow 360 of the embodiment of FIGS. 2 and 3 is dispensed with, an outlet 570 is internally threaded so that it can threadedly engage in externally threaded portion 556 on the free end of a large diameter portion 532 of a nozzle 526. O-rings 572, 586, jaw member 574, gasket 588, and lock nut 576 form a water-tight seal for an opening 522 in the side of the tubing 510 and an opening in a sidewall 582 of a bathtub 584.

III. The Saddle Clamp Type Connector Assembly Embodiments

Figure 5:
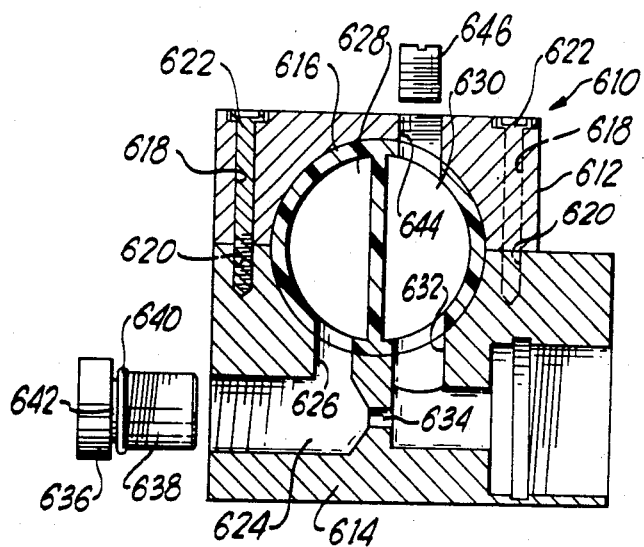
FIG. 5 is a cross-sectional view of a second exemplary embodiment of a connector assembly constructed in accordance with the present invention.

As shown in FIG. 5, a saddle clamp 610 includes a pair of clamp members 612, 614. The saddle member 612 is positioned to the upper side of a piece of dual channel tubing 616, the saddle member 614 being positioned to the lower side of the tubing 616 substantially diametrically opposite the saddle member 612.

The saddle member 612 has holes 618 passing completely therethrough. The holes 618 are aligned with blind bores 620 in the adjacent surface of the saddle member 614. The holes 618 and the bores 620 are internally threaded so as to receive externally threaded bolts 622 which maintain the saddle members 612 and 614 clamped about the tubing 616. The bolts 622 also permit the position of the saddle members 612, 614 to be adjusted with respect to each other.

The saddle member 614 includes a passageway 624 extending therethrough below the dual channel tubing 616. A water inlet opening 626 communicates between a water channel 628 of the tubing 616 and the passageway 624. The passageway 624 also communicates with an air channel 630 through an air inlet opening 632 in the saddle member 614. The portion of the passageway 624 between the water inlet opening 626 and the air inlet opening 632 includes a venturi 634 for enhancing the mixture of water and air and for speeding the flow of the water and air through the passageway 624. The end of the passageway 624 nearest the air inlet opening 632 is internally threaded so as to receive an externally threaded portion of an outlet (not shown) mounted in the sidewall of a water receptacle, such as a bathtub. A plug 626 has an externally threaded portion 638 which threadedly engages an internally threaded portion of the passageway 624 at the opposite end thereof. An O-ring 640 is disposed about a shank portion 642 of the plug 636 to provide a water-tight seal.

The saddle member 612 has an internally threaded opening 644 which communicates at one end with the air channel 630 of the tubing 610. An externally threaded plug 646 is threadedly received in the opening 644, so that the air channel 630 may be selectively opened and closed to the atmosphere.

Figure 7:
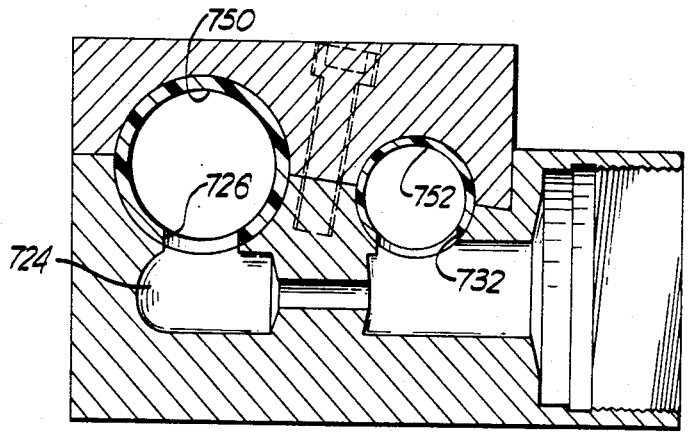
FIG. 7 is a cross-sectional view of a fourth exemplary embodiment of a connector assembly constructed in accordance with the present invention.
Figure 8:
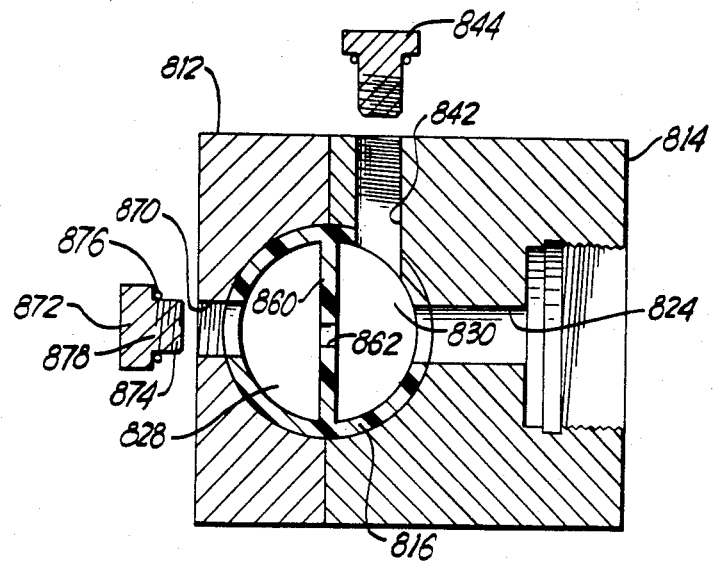
FIG. 8 is a cross-sectional view of a fifth exemplary embodiment of a connector assembly constructed in accordance with the present invention.

FIGS. 7 and 8 illustrate further exemplary embodiments of the connector assembly in FIG. 5. The various elements illustrated in FIGS. 7 and 8 which correspond to elements described above with respect to FIG. 5 have been designated by corresponding reference numerals increased by 100 and 200, respectively. The embodiments of FIGS. 7 and 8 operate in the same manner as the embodiment of FIG. 5, unless it is otherwise stated.

Referring to FIG. 7, a water inlet opening 726 of a passageway 724 communicates with the interior of a water supply conduit 750. An air inlet opening 732 communicates between the passageway 724 and the interior of an air supply conduit 752.

As shown in FIG. 8, a piece of dual channel tubing 816 is flanked on either side by saddle members 812, 814. The tubing 816 includes a partition 860 which extends across the interior thereof along a diameter or any other chord. An aperture 862 in the partition 860 permits a water channel 828 on one side of the partition 860 to communicate with an air channel 830 on the other side of the partition 860, the aperture 862 acting as a venturi for enhancing the mixture of water and air and for speeding the flow of water and air out of the tubing 816 and through a passageway 824 provided in the saddle member 814.

A vertical opening 842 in the saddle member 814 connects the air channel 330 to the atmosphere. A plug 844 threadedly received in the opening 842 permits the selective opening and closing of the air channel 830 to the atmosphere.

A horizontal internally threaded opening 870 in the saddle member 812 communicates with a water channel 828 of the tubing 816. A plug 872 has an externally threaded opening 870 in the saddle member 812 for permitting access to the water channel 828. An O-ring 876 disposed about a shank portion 878 of the plug 872 forms a water-tight seal.

IV. The Method of Bending Dual Channel Tubing

When a piece of dual channel tubing, like the dual channel tubing described above, is extruded in a single straight length of thermoplastic material, the tubing must be bent in order to match the contour of a water receptacle, such as a bathtub. One especially advantageous method of bending such tubing involves using a Greenlee No. 850 PVC Bender which is filled with triethylene glycol. After the triethylene glycol is heated to about 230°-260° F., the dual tubing is inserted into the bath and maintained therein until the thermoplastic material is sufficiently soft so as to render the tubing bendable. The tubing can then be bent, either in a direction perpendicular to or parallel to the partition extending across the interior of the tubing.

Figure 11:
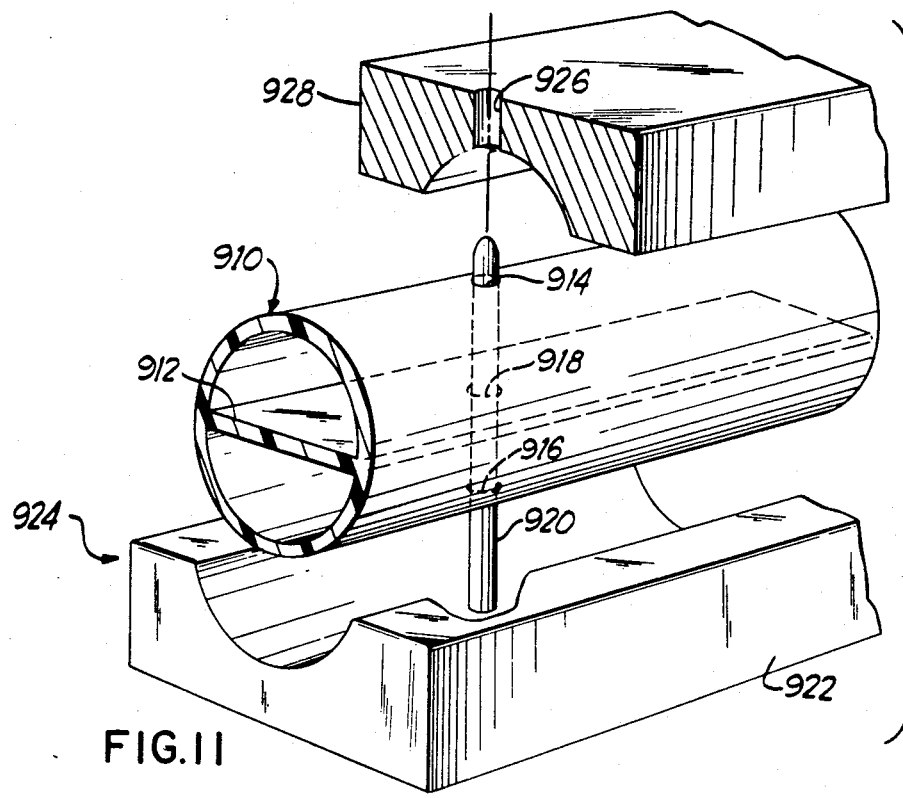
FIG. 11 is an exploded view of a clamp assembly useful in bending dual channel tubing in accordance with the present invention.

If difficulties are encountered in maintaining the original shape of the softened tubing, including the partition, during its cooling, the following procedure, which is described below with reference to FIG. 11, may be followed. Referring to FIG. 11, dual channel tubing 910 has a partition 912 which runs the length thereof. At predetermined locations, corresponding to the locations where a connector assembly will be attached to the tubing, three aligned holes 914, 916, 918 are formed in the tubing 910 prior to its softening. The holes 914, 916 are formed in opposite sides of the tubing 910, the other hole 918 being formed in the partition 912.

Either prior to, simultaneously with or immediately after the bending of the tubing 910 into a desired shape, a peg 920, which extends upwardly from a lower saddle member 922 of a saddle clamp 924, is inserted through the holes 914, 916, 918, and into a hole 926 in an upper saddle member 928 of the saddle clamp 924 to help maintain the original shape of the partition 912 as well as its proper orientation with respect to the rest of the tubing 910. The saddle members 922 and 928 are then clamped over the outer surface of the tubing to help maintain its original cross-sectional shape, thereby aiding in the support of the softened partition 912.

The tubing 910 can be cooled at room temperature. Alternatively, cooling of the tubing 910 can be expedited by passing a cool fluid, such as air or water, in and/or around the softened tubing 910.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

What is claimed is:

1. A method of manufacturing a liquid distribution network for a whirlpool system from a continuous piece of thermoplastic, multiple channel tubing, which includes at least a pair of channels separated by a partition, comprising the steps of providing a plurality of holes through said tubing, including said partition, at predetermined locations along the length of said tubing, said predetermined locations corresponding to sites where whirlpool jets will be attached to said tubing; softening said tubing to an extent such that said tubing is bendable; inserting a peg through each of said holes in said tubing; clamping said tubing in the vicinity of each of said holes therein; and bending said softened tubing into a desired configuration which substantially matches the outer contour of a water receptacle.

2. A method according to claim 1, wherein the softening step includes inserting said tubing into a hot liquid bath and maintaining said tubing in said bath until said tubing is bendable.

3. A method according to claim 2, wherein the liquid in said bath is triethylene glycol.

4. A method according to claim 3, wherein the temperature of said bath is in a range of about 230°-260° F.

5. A method according to claim 1, wherein the direction of bending is substantially parallel to said partition.

6. A method according to claim 1, wherein the direction of bending is substantially perpendicular to said partition.

7. A method according to claim 1, further comprising the step of cooling said softened tubing after it is pegged and clamped.

8. A method according to claim 1, wherein said tubing is pegged and clamped prior to said bending step.

9. a method according to claim 1, wherein said tubing is pegged and clamped immediately after said bending step.

10. A method of bending thermoplastic, multiple channel tubing, which includes at least a pair of channels separated by a partition, comprising the steps of providing a plurality of holes through said tubing, including said partition, at predetermined locations along the length of said tubing; softening said tubing to an extent such that said tubing is bendable; inserting a peg through each of said holes in said tubing; clamping said tubing in the vicinity of each of said holes therein; and bending said softened tubing into a desired configuration.

11. A method according to claim 10, wherein the softening step includes inserting said tubing into a hot liquid bath and maintaining said tubing in said bath until said tubing is bendable.

12. A method according to claim 11, wherein the liquid in said bath is triethylene glycol.

13. A method according to claim 12, wherein the temperature of said bath is in the range of about 230°–260° F.

14. A method according to claim 1, wherein the direction of bending is substantially parallel to said partition.

15. A method according to claim 1, wherein the direction of bending is substantially perpendicular to said partition.

16. A method according to claim 10, further comprising the step of cooling the softened tubing after it is pegged and clamped.

17. A method according to claim 10, wherein the softened tubing is pegged and clamped prior to said bending step.

18. A method according to claim 10, wherein the tubing is pegged and clamped immediately after said bending step.

19. Apparatus useful in bending softened multiple channel tubing having a predetermined cross-sectional shape and a partition of a predetermined shape which separates the tubing into a multiplicity of channels, comprising maintaining means for maintaining the cross-sectional shape of a section of the softened tubing and for maintaining the shape of the partition and its proper orientation with respect to the rest of the tubing, said maintaining means including a first saddle clamp member positioned on one side of the tubing and a second saddle clamp member positioned on an opposite side of the tubing, said first and second saddle clamp members having surfaces with a contour which substantially matches at least a portion of the cross-sectional shape of the tubing, and a peg attached to and extending from said first saddle clamp member to said second saddle clamp member through one hole provided in said second saddle clamp member and another hole provided in the tubing, including its partition, whereby said peg cooperates with said first and second saddle clamp members to maintain the shape of the partition and its proper orientation with respect to the rest of the tubing.

* * * * *

UNITED STATES PATENT AND TRADEMARK OFFICE
CERTIFICATE OF CORRECTION

PATENT NO. : 4,533,512
DATED : August 6, 1985
INVENTOR(S) : Altman et al.

It is certified that error appears in the above-identified patent and that said Letters Patent is hereby corrected as shown below:

Column 1, line 59, delete "ater" and substitute therefor --water--.

Column 6, line 54, delete "626" and substitute therefor --636--.

Column 7, line 24, delete "330" and substitute therefor --830--.

Column 7, line 44, after "dual" add --channel--.

Column 8, line 51, delete "a" and substitute therefor --A--.

Column 9, line 6, delete "1" and substitute therefor --10--.

Column 9, line 9, delete "1" and substitute therefor --10--.

Column 9, line 16, delete "softened".

Signed and Sealed this

Twelfth Day of November 1985

[SEAL]

Attest:

DONALD J. QUIGG

Attesting Officer

Commissioner of Patents and Trademarks